(12) United States Patent
Lange et al.

(10) Patent No.: US 7,084,929 B2
(45) Date of Patent: Aug. 1, 2006

(54) VIDEO DATA FILTERING ARRANGEMENT AND METHOD

(75) Inventors: Tim Lange, Phoenix, AZ (US); Jud Lehman, Scottsdale, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 630 days.

(21) Appl. No.: 10/207,311

(22) Filed: Jul. 29, 2002

(65) Prior Publication Data
US 2004/0017515 A1   Jan. 29, 2004

(51) Int. Cl.
*H04N 9/64* (2006.01)

(52) U.S. Cl. ............. 348/716; 375/240.24; 375/240.29

(58) Field of Classification Search ............... 348/714, 348/716, 607, 581; 345/611, 543, 544; 382/268; 711/170, 171, 173; 375/240.24, 240.27, 375/240.29
See application file for complete search history.

(56) References Cited

U.S. PATENT DOCUMENTS

| | | | | |
|---|---|---|---|---|
| 6,236,764 | B1 * | 5/2001 | Zhou | 382/266 |
| 6,320,905 | B1 * | 11/2001 | Konstantinides | 375/240.08 |
| 6,823,087 | B1 * | 11/2004 | Liu et al. | 382/266 |
| 2001/0046265 | A1 * | 11/2001 | Assaf | 375/240.16 |
| 2003/0152146 | A1 * | 8/2003 | Lin et al. | 375/240.16 |
| 2003/0194013 | A1 * | 10/2003 | Alvarez | 375/240.24 |

* cited by examiner

*Primary Examiner*—Victor R. Kostak
(74) *Attorney, Agent, or Firm*—Michael T. Ure

(57) ABSTRACT

Signal processing is enhanced using a filtering arrangement that re-uses data in a register array for filtering consecutive pixel blocks. According to an example embodiment of the present invention, consecutive blocks of pixel data corresponding to an image and sharing an edge therebetween is filtered. The consecutive blocks of pixel data are read and loaded into first and second halves of a register array, and pixel data in registers on opposite sides of the edge is filtered and returned to the register array. After filtering, data in the first half of the register array is unloaded and written back to the memory. Data in the second half of the register array is then shifted to the first half of the register array and additional pixel data is read and loaded into the second half of the register array. The additional pixel data corresponds to the image, is consecutive to and shares an edge with the pixel data shifted to the first half of the register array. In a more particular example embodiment of the present invention, pixel data in the first half of the register array and corresponding to a vertical edge between left and right halves of the pixel data is also filtered, prior to being unloaded and written back into memory. With these approaches, edge data from an image that may, for example, exhibit blockiness or other characteristics can be filtered using a register array while re-using a portion of data loaded into the register array.

26 Claims, 12 Drawing Sheets

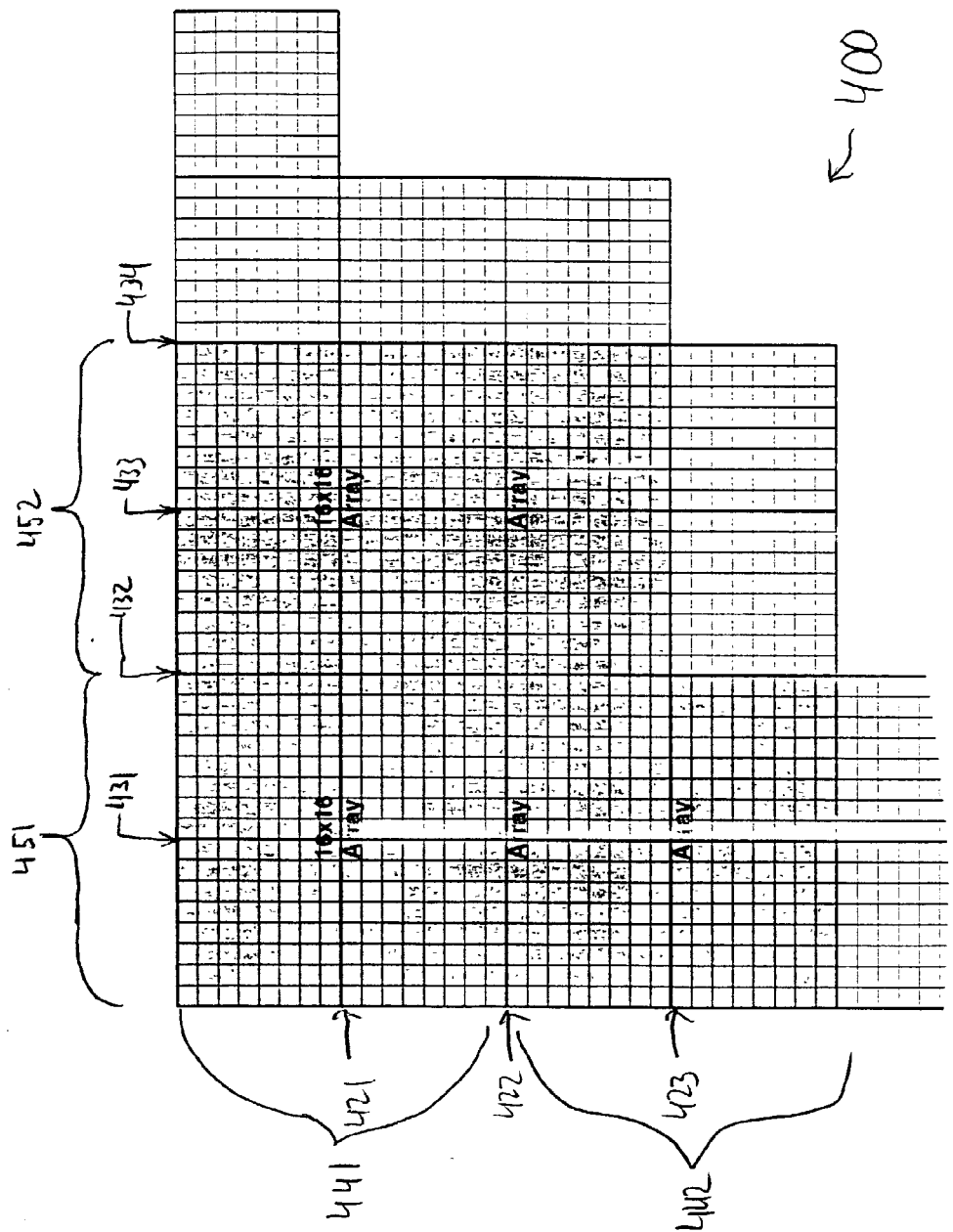

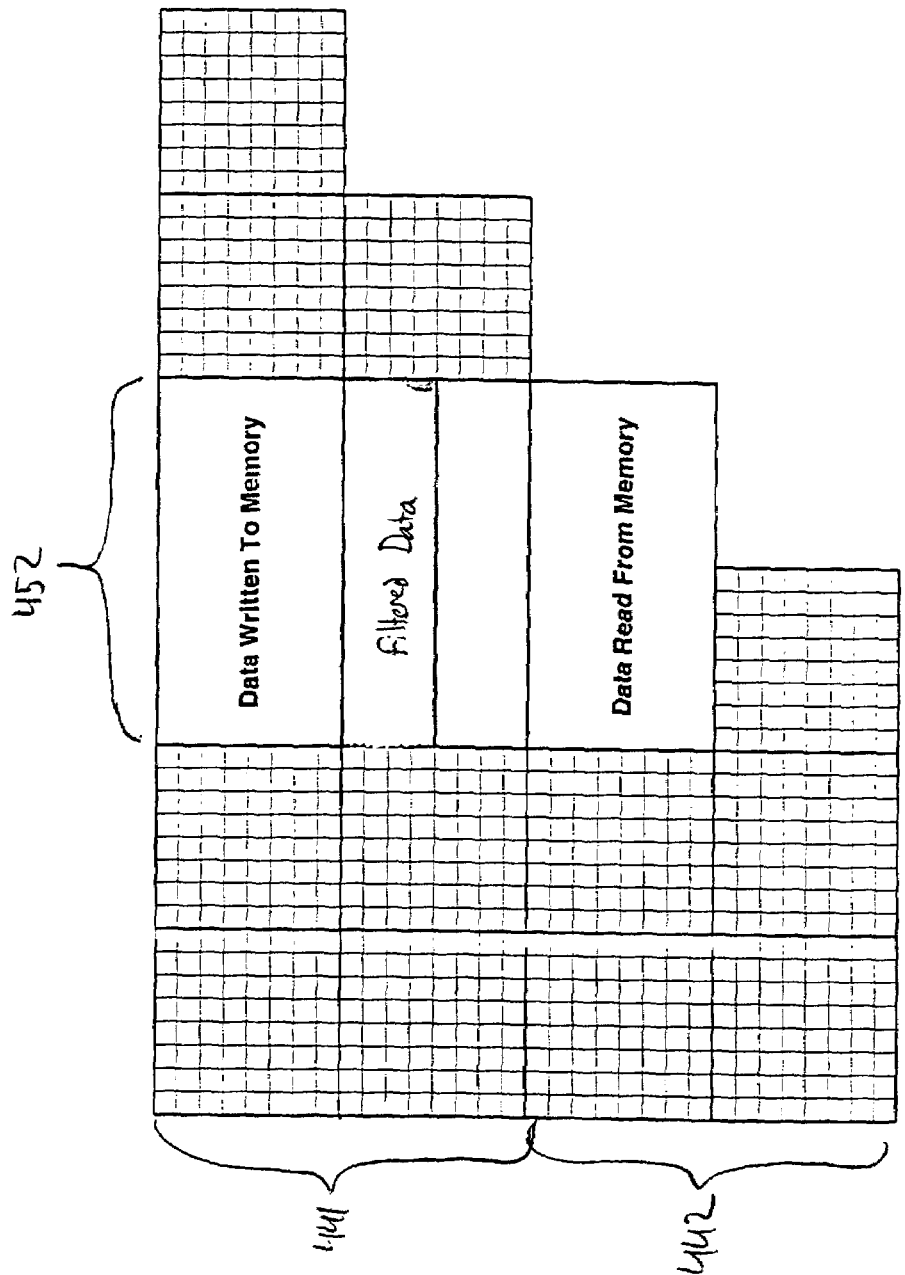

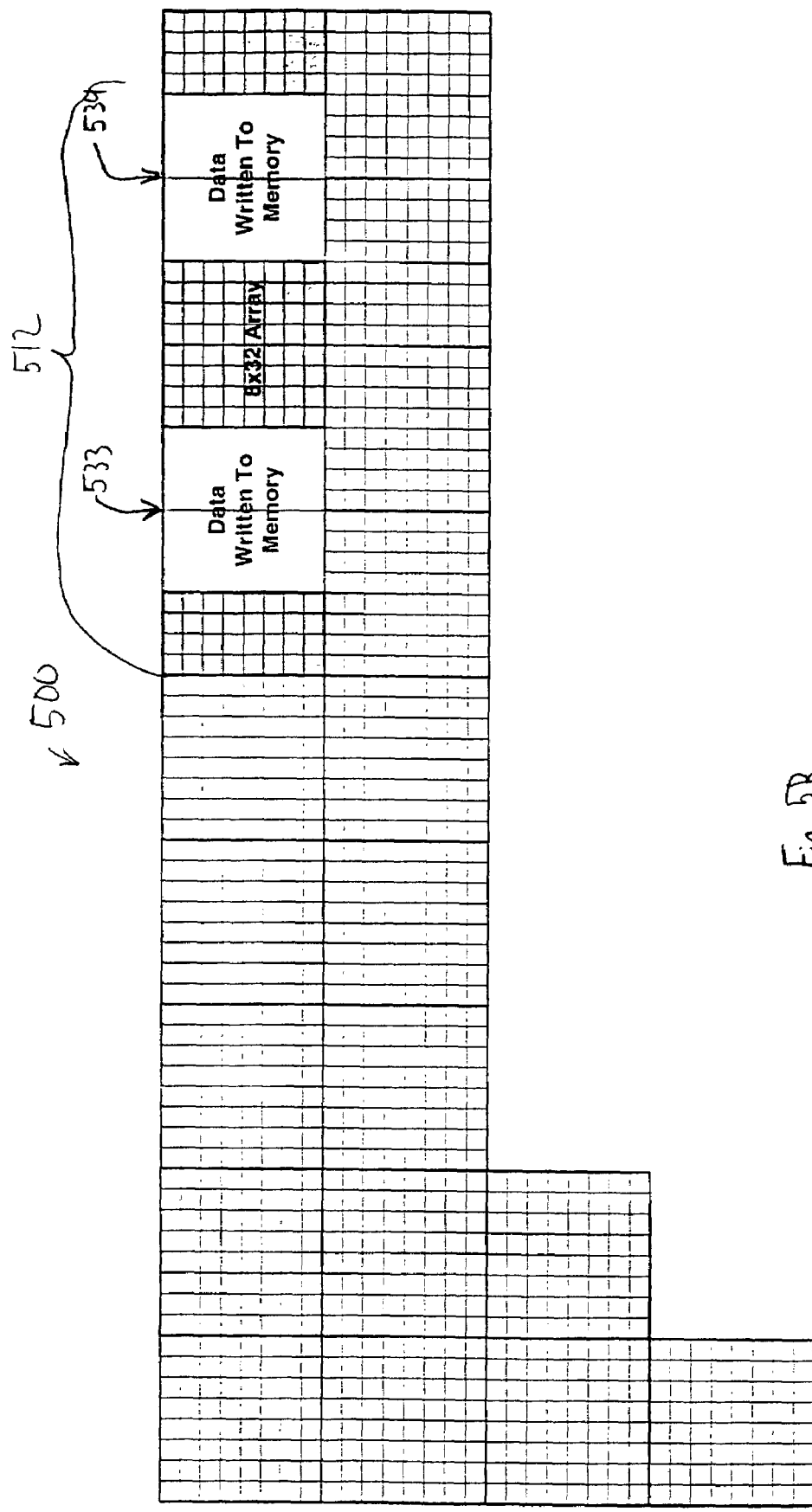

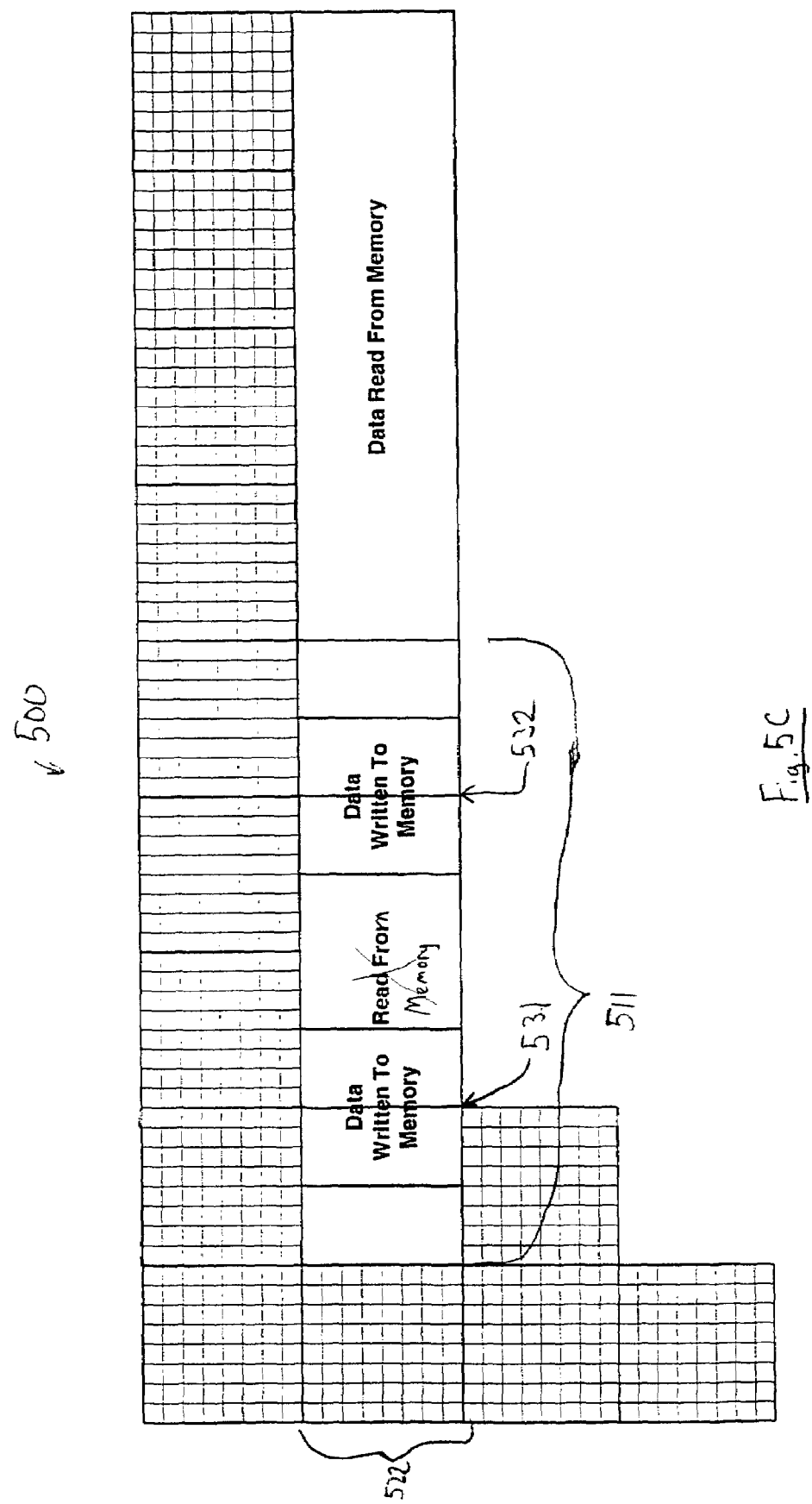

US 7,084,929 B2

VIDEO DATA FILTERING ARRANGEMENT AND METHOD

FIELD OF THE INVENTION

The present invention is directed to signal processing and, more particularly, to deblocking filtering in signal processing.

BACKGROUND

Computer arrangements, including microprocessors and digital signal processors, have been designed for a wide range of applications and have been used in virtually every industry. For a variety of reasons, many of these applications have been directed to processing data, such as video and audio data, and have demanded minimal levels of power consumption and compactness. Some applications have further demanded a high-speed computing engine that can perform effectively on a real-time or near real-time basis. Many of these data-processing applications have required a data-signal processing circuit that is capable of performing multiple functions at ever-increasing speeds.

Various video and audio signal processing applications, such as moving pictures experts groups (MPEG) applications including MPEG-4, digital television, interactive graphics applications (e.g., synthetic content), interactive multimedia and others, employ standardized technological elements that enable the integration of various types of data for various applications. For example, the production, distribution and content access paradigms of video applications such as digital television, interactive graphics applications (e.g., synthetic content) and interactive multimedia (e.g., World Wide Web, distribution of and access to content) can be integrated. For these and other applications, the MPEG-4 standard provides a set of technologies to satisfy the needs of authors, service providers and end users alike, improving the ability to integrate these applications. For more information regarding the MPEG-4 standard, reference may be made to "Overview of the MPEG-4 Standard" available from the moving pictures experts group at the International Organisation for Standardisation, at the Telecom Italia Lab of Torino, Italy.

The MPEG-4 standard provides standardized ways to represent units of content, such as aural, visual and/or audiovisual content, called "media objects." These media objects can be of natural or synthetic origin, such as natural content recorded with a camera or a microphone, or synthetic computer-generated content. The composition of these media objects is described to create compound media objects that form audiovisual scenes. Data associated with media objects is multiplexed and synchronized so that the it can be transported over network channels, providing a quality of service (QoS) appropriate for the nature of the specific media objects, and interact with an audiovisual scene generated at a receiver's end.

In signal processing applications, such as those employing the MPEG-4 standard, it is sometimes beneficial to filter signal data. For instance, MPEG-4 compression operates on 8×8 blocks of pixels, which are commonly read from and/or written to memory via 8 two-word bus accesses using a 32-bit bus. In memory, these pixels are little endian; larger byte addresses contain higher numbered pixels, with each pixel having an 8-bit value. With this approach, one 32-bit word includes 4 pixels, commonly referred to as a quad. MPEG-4 compression is lossy; the 8×8 blocks of pixels that come out of a decompression step may differ from the 8×8 blocks that were input to the compression step. Therefore, when multiple 8×8 blocks of pixels are assembled into an image, boundaries between the 8×8 blocks may be evident (e.g., the image exhibits "blockiness" in the form of horizontal and vertical edges). In order to address the blockiness, data defining the edge of video objects determined by pixel locations can be filtered to provide a better image. Such filtering, however, has been challenging in that filtering for various types of data, such as for horizontal and vertical edge filtering, has typically employed different types of filters. In addition, many previous filtering approaches do not efficiently use gates and/or memory cycles, which can undesirably require relatively high bandwidth and memory.

The present invention is directed to addressing challenges to the implementation and integration of signal processing applications, including the above-mentioned and to the filtering of signals in MPEG-4 and other types of signal processing.

SUMMARY OF THE INVENTION

Various aspects of the present invention are directed to filtering in signal processing applications, and in a more specific application, to deblocking filtering with MPEG-4 applications.

According to one example embodiment of the present invention, edge data between blocks of pixel data for video signals is filtered using a data storage arrangement and filtering circuitry. A single data storage arrangement can be used for both the vertical and horizontal filtering, with data stored and filtered in a first step being reused in a subsequent step before written back to memory. With this approach, memory bandwidth can be reduced due to the ability to maintain data in the storage arrangement for a subsequent filtering operation, rather than writing the data back to memory and re-reading the data at some time later. In addition, the loading and/or unloading (reading from and to memory) can be effected simultaneously with moving data from the first to the second portion of the storage arrangement, which is efficient in that it can be accomplished in a single clock cycle.

In a more particular example embodiment of the present invention, consecutive blocks of pixel data that share an edge in an image are loaded into first and second halves of a register array, respectively, such that an edge shared by the first and second halves of the register array corresponds to the edge in the image. Data in registers on opposite sides of the edge in the register array is sent to filtering circuitry and returned to the register array. After data along the entire edge has been filtered, data in the first half of the register array is unloaded and written to memory. Data in the second half of the register array is shifted into the first half of the register array and new pixel data is loaded into the second half of the register array. The new pixel data corresponds to a block of pixel data that shares an edge in the image with the data shifted into the first half of the register array. Data is again sent to the filtering circuitry as discussed above, with the filtering, unloading and loading being repeated until data in an entire column or row of the image has been filtered. At the end of the row or column, data in both halves of the register array is unloaded and written to memory, and the reading, filtering and unloading of data with the register array is repeated for additional rows and/or columns of the image. In a more particular implementation, both horizontal and vertical edge data for an image is filtered using the register array in separate passes through the memory. In another more particular implementation, both horizontal and vertical edge data is filtered in the first half of the register array, prior to unloading the data and writing the data back into the memory.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 4A–4D show a combination of vertical and horizontal edge filtering of data in an array of 16×16 pixel blocks, according to another example embodiment of the present invention;

FIGS. 5A–5C show vertical edge filtering of data in an array of 8×32 pixel blocks, according to another example embodiment of the present invention.

Figure 1:
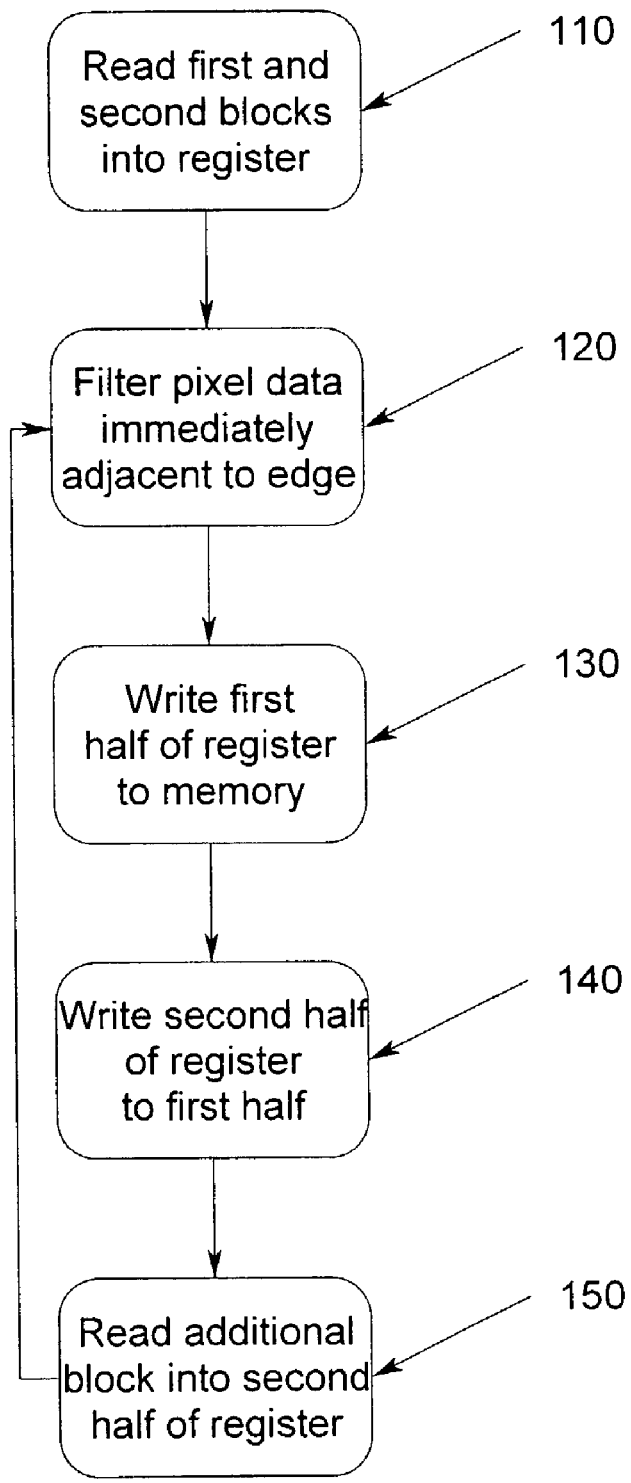
FIG. 1 is a flow diagram for a method for filtering data using a register array configured and arranged for both horizontal and vertical edge filtering, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EXAMPLE EMBODIMENTS

The present invention is believed to be highly applicable to methods and arrangements for signal processing, such as video signal processing in MPEG-4-type application. The invention has been found to be particularly advantageous for video data processing for filtering vertical and horizontal edges of adjoining pixel blocks (e.g., in an 8×8 array). While the present invention is not necessarily limited to such applications, an appreciation of various aspects of the invention is best gained through a discussion of examples in such an environment.

According to an example embodiment of the present invention, video pixel data is filtered using a storage arrangement, such as a register array or a memory, arranged to reuse data stored therein during consecutive filtering operations. The data stored in the storage arrangement corresponds to two sets of video pixel data having an edge therebetween, each set being stored in first and second portions of the storage arrangement, respectively. The video pixel data may, for example, correspond to consecutive video data for use in computers, digital television, interactive graphics applications and/or interactive media applications. Data in the storage arrangement that corresponds to data from both video pixel data sets abutting the edge is filtered. For instance, a few contiguous pixels of data extending outwardly from either side of the edge is filtered to smooth or otherwise alter the appearance of the display of video data corresponding to the pixels near the edge, such as for correcting blockiness. After filtering, data from the first portion of the storage arrangement is written to memory, data from the second portion of the storage arrangement is maintained in the storage arrangement (e.g., transferred into the first portion), and new data is read into the storage arrangement. The new data corresponds to pixels adjacent to and sharing another edge with those pixels to which the pixel data originally stored in the second portion of the storage arrangement correspond. Data in the array is again filtered as discussed above, with data originally in the second portion of the storage arrangement being written to memory, the new data being maintained in the storage arrangement and with a second set of new data similarly being read into the storage arrangement. With this approach, either horizontal or vertical filtering can be accomplished using a single storage arrangement type. In addition, the data can be filtered using only one read and one write of the data from and to memory for each of the horizontal or vertical filtering steps. For more information regarding filtering circuitry and filtering algorithms that can be used in connection with the present invention, reference may be made to the "Overview of the MPEG-4 Standard" document referenced above, which is fully incorporated herein by reference.

FIG. 1 is a flow diagram for filtering pixel data representing a video image, according to another example embodiment of the present invention. Beginning with block 110, first and second blocks of pixel data are read from memory and into first and second halves of a register array, respectively. Each of the first and second blocks correspond to immediately adjacent blocks of pixel data that share an edge therebetween. For instance, the first and second blocks may include 8×8 blocks of pixels representing continuous image data, with each block having 8 pixel blocks immediately adjacent to the shared edge. When pixel blocks corresponding to vertically-adjacent image data are being filtered, a horizontal edge between the two blocks exists. Similarly, when pixel blocks corresponding to horizontally-adjacent image data are filtered, a vertical edge exists between the two blocks. At block 120, pixel data from each of the first and second blocks of pixel data along the shared edge are filtered. After filtering, data including the filtered data in the first half of the register array is written to the memory at block 130. At block 140, data including the filtered data in the second half of the register array is written into the first half of the register array. New data corresponding to an additional block of data for pixels immediately adjacent to the second block is read into the second half of the register array at block 150. The process then resumes at block 120, with data corresponding to an edge shared by the additional block of pixel data and the second block of pixel data being filtered. The sequence of reading, filtering and writing in blocks 120–150 is repeated for additional blocks corresponding to the video image.

Figure 2A:
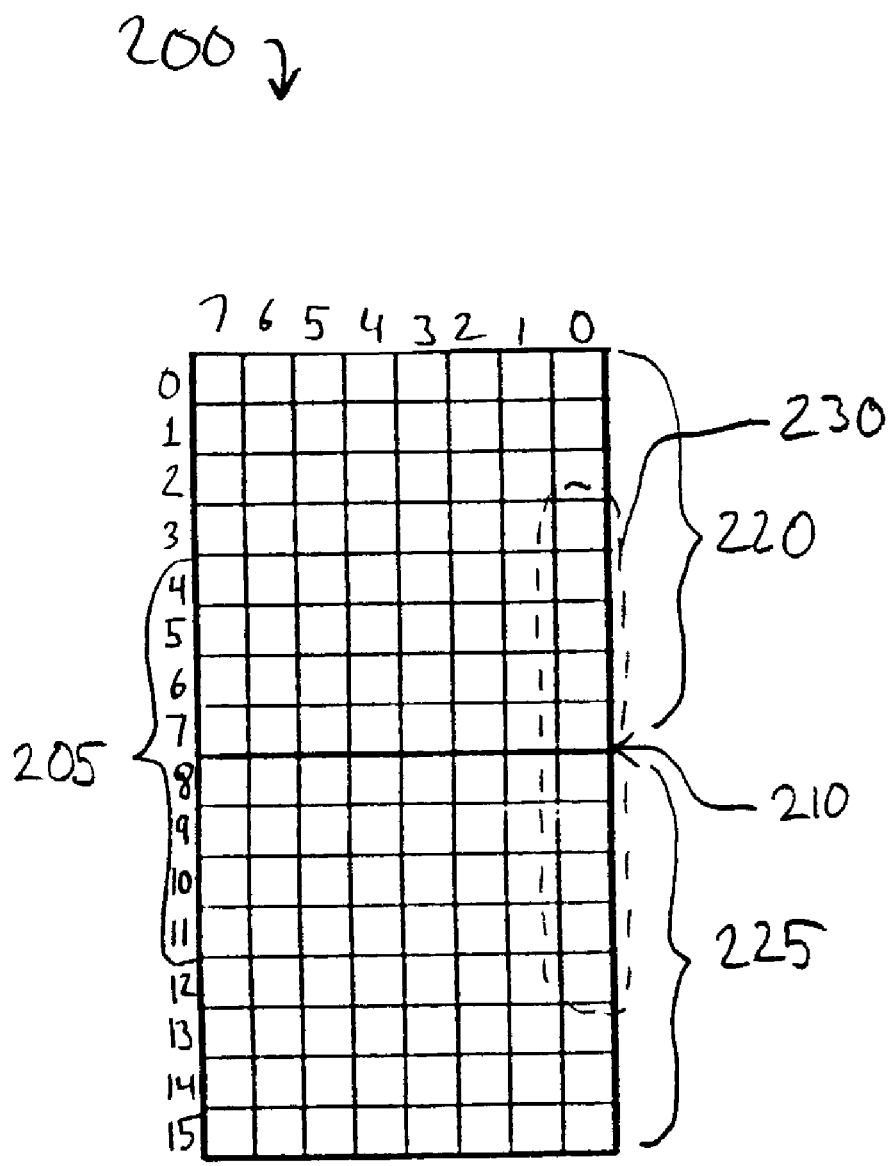
FIG. 2A is a register array configured and arranged for filtering horizontal or vertical edge data, according to an example embodiment of the present invention.

A variety of register array sizes and orientations can be implemented in a manner consistent with the present invention. FIG. 2A shows one such register array 200 arranged to store an 8×16 block of pixels, according to one example embodiment of the present invention. The register array 200 includes eight columns, labeled 0–7, and sixteen rows that make up an 8×16 array of pixel registers, each register being an 8-bit register capable of storing data for a pixel. For horizontal edge filtering, pixels sharing an edge region 210 are read into upper and lower 8×8 pixel block portions 220 and 225, respectively, of the register array 200 (e.g., as with block 110 in FIG. 1). Beginning with slice 230, 1×10 slices of pixels stored in the registers in a middle portion 205 of the register array 200 are filtered, with a 1×8 slice of filtered pixels corresponding to four pixel registers on either side of edge region 210 being returned to the register array 200. The filtering is continued until pixels in columns 0–7 in portion 205 of the register array 200 have all been filtered.

After the pixels in each column for middle portion 205 of the register array have been filtered, data in the register is updated for a next filtering cycle for an 8×8 pixel block sharing a lower edge with the pixels in lower 8×8 pixel block portion 225. Pixels stored in the upper 8×8 pixel block portion 220 are written into memory, pixels stored in the lower 8×8 pixel block portion 225 are shifted into the upper 8×8 pixel block portion 220 and a new 8×8 block of pixels is read from memory and placed into the lower 8×8 pixel block portion 225. The write, shift and read operations may, for example, be carried out in a single memory access cycle. After the data is shifted, the upper four rows of pixels in the upper 8×8 pixel block portion 220 include filtered data and the lower four rows of pixels in the upper 8×8 pixel block portion 220 are unfiltered. Slices of edge data are again filtered in a manner similar to that discussed above, beginning with slice 230. Once the data is filtered, the write, shift and read operations are again performed, and another new 8×8 pixel block of pixels is read into the register array 200. When the end of a column of 8×8 pixel blocks is reached and filtered, both halves of the register array are written to memory. When a different column of 8×8 pixel blocks is to be filtered, new 8×8 pixel blocks are read into both the upper 220 and lower 225 8×8 pixel block portions, with the process continuing as discussed above.

Figure 2B:
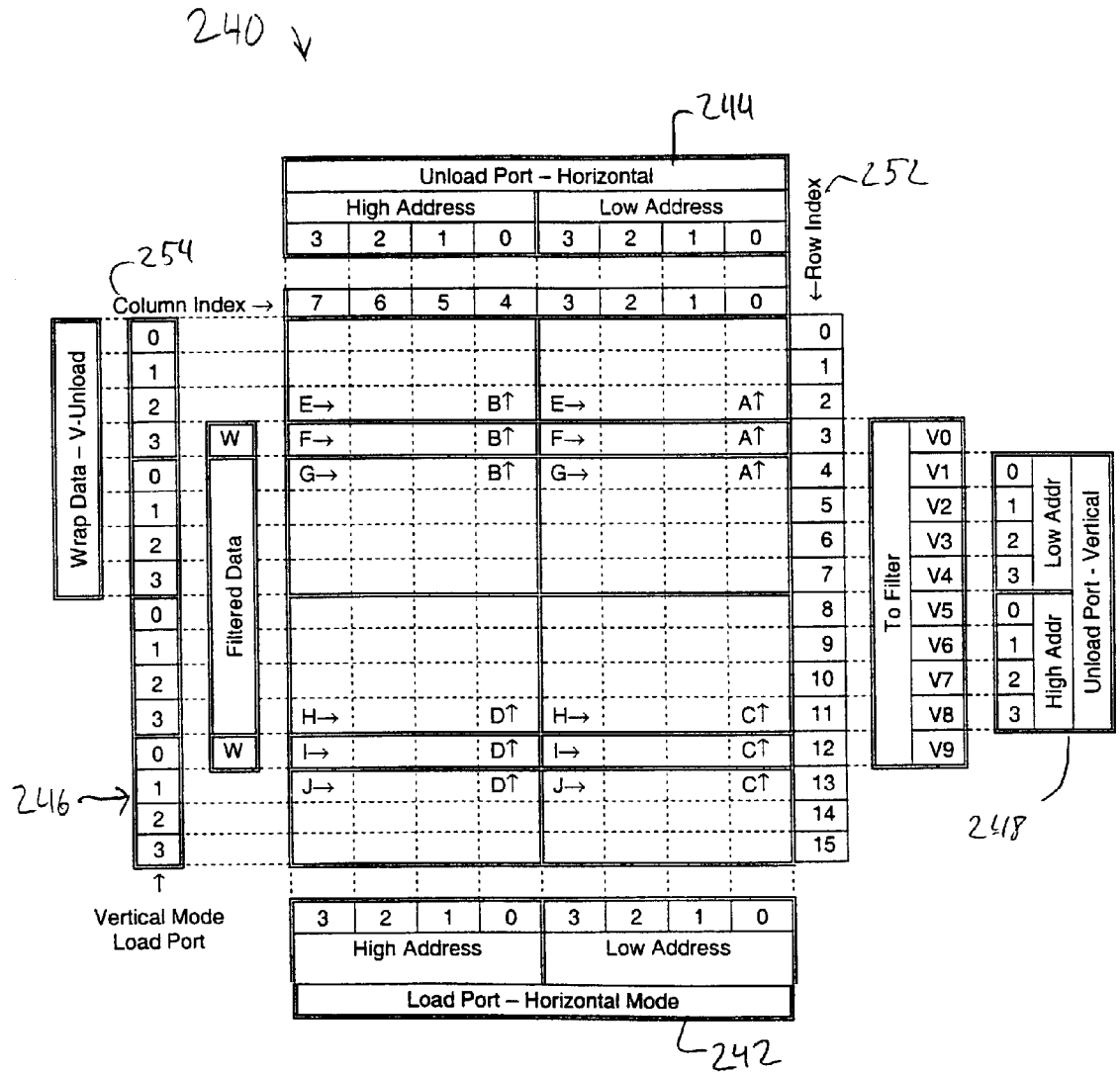
FIG. 2B is a block diagram of one implementation for the register array of FIG. 2A, according to an example embodiment of the present invention.

FIG. 2B is a block diagram 240 for one implementation of the register array 200 in FIG. 2A, according to a particular example embodiment of the present invention. In this implementation, the register array 200 operates as a first-in-first-out (FIFO) array (e.g., shift register) as it is loaded from a memory read port, with data in the array being shifted from bottom to top via horizontal load and unload ports 242 and 244, respectively, for horizontal edge filtering. After the data is filtered, it is shifted out of the register array via the unload port 244 to be written back to memory. For vertical edge filtering, data is similarly shifted in the register array, but from left to right instead of bottom to top, using load and unload ports 246 and 248, respectively. The register array 200 operates as a shift register to shift pixel data within the register and to supply pixels to filter computation logic (not shown) for filtering, as well as save the filtered result.

The row and column indexes 252 and 254, respectively, show where 8-bit pixel registers are located in the array. The boundary between 8×8 pixel blocks read into the array for both horizontal and vertical edge filtering is the boundary between rows 7 and 8. The arrow "↑" and "→" notations show possible directions in which data in the array can be shifted, with each defined area on the block diagram 240 being uniquely controlled for executing horizontal and vertical shifts. The boxes outside the row-column array represent multiplexing that is external to the shifting within the core register array. The upward shifts are represented as follows: for "A↑," a 4×8 slice of the array in rows 0–7, columns 3–0 is shifted up; for "B↑," a 4×8 slice of the array in rows 0–7, columns 7–4 is shifted up; for "C↑," a 4×8 slice of the array in rows 8–15, columns 3–0 is shifted up; and for "D↑," a 4×8 slice of the array in rows 8–15, columns 7–4 is shifted up. For C↑ and D↑, the bottom registers are loaded during the shift. For right shifts of the array, E→, F→, G→, H→, I→ and J→ shifts are used for loading data for vertical edge filtering and/or for shifting data during filtering.

In one implementation, horizontal edge filtering is effected using the block diagram 240 as follows. Two 8×8 pixel blocks are loaded into the array 200, with the first 8×8 pixel block coming from an upper portion of an image and the second 8×8 pixel block coming from an immediately adjacent portion of the image that is directly below the first 8×8 pixel block. Pixel data is loaded into row 15 using A↑ and C↑ for a low address quad, and B↑ and D↑ for a high address quad, each quad including a four-pixel-wide set of data. Once the pixel data is loaded into the register array 200, a filtering algorithm then effects right shifts of the data, for example, using F→, G→, H→ and I→ to load newly-filtered data into column 7, rows 4–11 and at the same time presenting new unfiltered data from column 0, rows 3–12 to the filtering algorithm. During filtering, column 0, row 3 is wrapped back to column 7, row 3; similarly, column 0, row 12 is wrapped back to column 7, row 12, as only rows 4–11 are returned from the filtering calculation. For each filtering operation, the data in each column in the register array is shifted one column to the right, with the rightmost (0) column being filtered and written back into the leftmost (7) column. The filtering and shifting takes place until all data in rows 4–11 has been filtered and shifted back into it's original location in the array 200 (e.g., after 8 filtering and shifting operations, the filtered data is back in the column in which it began as unfiltered data).

After filtering for the horizontal edge, the top 8 rows (0–7) of the array 200 are unloaded into memory using A↑ and B↑ at a data tap point of row 0. Columns 0–3 are used for the low address quad and columns 4–7 are used for the high address quad. When the high address is written into memory, A↑ and B↑ go active and cause a shift-up of the top 8×8 section of the array 200. During this unload step, the bottom 8 rows (8–15) of the array are not shifted. In one implementation, the data in row 8 gets replicated into rows 0–7 during this unload step. Rows 0–7, having the replicated data, are then overwritten when new data is loaded into the bottom of the array.

After unloading the first 8×8 pixel block, a new 8×8 pixel block is loaded into the memory array 200, with the new 8×8 block being immediately adjacent to and directly below the second 8×8 pixel block in the image. Pixel data is loaded into row 15 using A↑ and C↑ shifts for the low address quad and B↑ and D↑ shifts for the high address quad, such that data in rows 8–15 is shifted into rows 0–7, preserving their contents. The filtering, unloading and loading (with corresponding shift of data from rows 8–15 into rows 0–7) is repeated until a complete column of 8×8 pixel blocks in the image is filtered. When a horizontal edge shared by the last two 8×8 pixel blocks in a column has been filtered, both 8×8 pixel blocks in the array are unloaded and written into memory, with A↑ and C↑ shifts unloading the low address quad and B↑ and D↑ shifts unloading the upper address quad.

In another implementation, vertical edge filtering is effected using the register array 200, in connection with the block diagram 240, as follows. Two 8×8 pixel blocks are loaded into the array 200, with the first 8×8 pixel block coming from a left edge of an image and the second 8×8 pixel block coming from an immediately adjacent portion of the image that is directly to the right of the first 8×8 pixel block of data. The 8×8 pixel data is loaded into column 7, rows 0–15 using E→ and F→ shifts for a first address quad (rows 0–3); using a G→ shift for a second address quad (rows 4–7); using an H→ shift for a third address quad (rows 8–11); and using I→ and J→ shifts for a fourth address quad (rows 12–15). The byte order of pixel data being loaded is byte order reversed, which is commonly referred to as being swizzled (e.g., converted between a virtual memory address and an object identifier) when compared to the loading of horizontal mode data, as discussed above, which orients the data for filtering. More specifically, the byte order reversal orients data along the vertical edge to correspond with the edge between rows 7 and 8 for the filtering calculation. After filtering, as discussed below, the data is byte order reversed again, or unswizzled, prior to unloading into memory.

After loading into the register array 200, the vertically-loaded 8×8 pixel blocks are filtered in a manner similar to that discussed above in connection with horizontal edge filtering. The F→, G→, H→ and I→ shifts are used for presenting unfiltered data at column 0, rows 3–12 to a filtering algorithm, while at the same time loading newly filtered data into column 7, rows 4–11. Data at column 0, rows 3 and 12 are wrapped back into column 7, rows 3 and 12, respectively.

After filtering, only the filtered boundary data is unloaded from the register array 200 and into memory. One quad on either side of the block boundary (e.g., the boundary between rows 7 and 8) is written back into memory, with a tap point for the unload being column 0, rows 4—7 for the low address quad and column 0, rows 8–11 for the high address quad. The unloading does not necessarily require that a complete array of data is written into memory, and in one implementation, only rows 4–11, corresponding to quads on either side of the boundary, are written into memory. When the high address quad is written, the entire array is shifted right using E→, F→, G→, H→, I→ and J→ shifts, and column 0, rows 8–15 are wrapped back into column 7, rows 0–7, with a new 8×8 pixel block being subsequently loaded into rows 8–15. The new 8×8 pixel block is loaded using H→, I→ and J→ shifts, feeding the data into the array at column 7, rows 8–15. The filtering, unloading and loading (with corresponding shift of data) is repeated until a complete row of 8×8 pixel blocks in the image is filtered.

In another example embodiment of the present invention, a tap point is added at column 1, rows 3–12 for pipelining the calculation of intermediate points in the filter computation path. Such pipelining is useful, for example, if the computation logic requires more than one clock and high filter bandwidth is required. Filtering circuitry including registers is arranged for holding intermediate results. A first clock of the filtering operation is used to calculate and store the intermediate values using the data from column 0. For 2nd through 9th clocks, the intermediate values are calculated using data from column 1 while the final filtered data is calculated using column 0 and the previously stored intermediate values. With this approach, a filter with a long computation path can operate at a higher frequency, with one additional clock being needed for each set of 8 filter computations. This has the effect of reducing overall computation time from 16 clocks (where two clocks per column needed) to 9 clocks, where one clock is used to prime the pipeline and one additional clock per column thereafter.

In another example embodiment of the present invention, the filtering system consists of two identical, independent blocks of filter computation logic. The register array has two sets of tap points, one for each block of computation logic. One set of tap points is at column 0, rows 3–12 for unfiltered data, with filtered data returning into column 3, rows 4–11 and unfiltered wrap data returning in column 3 rows 3 and 12. The second set of tap points is at column 4, rows 3–12 for unfiltered data, with filtered data returning into column 7, rows 4–11 and unfiltered wrap data returning in column 7 rows 3 and 12. The number of shifts required to perform the filtering is therefore reduced from 8 to 4. This paralleling of filter computation logic is for high-speed applications and may be better suited to larger register array sizes such as 16×16.

In the following discussion, the filtering approaches and techniques may use the register array 200 and corresponding filtering approaches discussed in connection with the block diagram 240. In implementations using larger register arrays, similar loading, unloading, filtering and shifting techniques may be used. In this regard, specific discussion of these aspects of the present invention is omitted below for brevity.

Figure 3A:
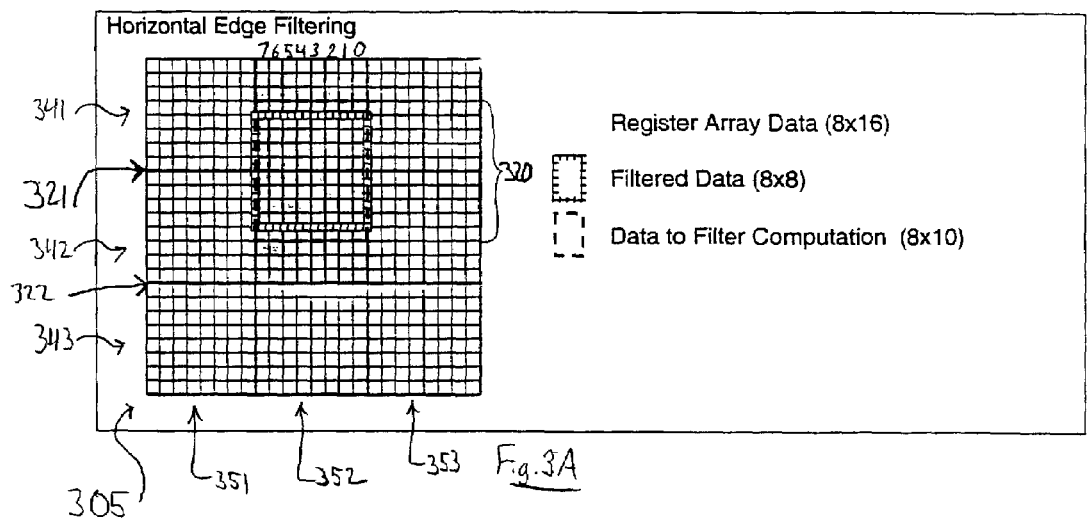
FIG. 3A shows horizontal edge filtering of data using a register array configured and arranged for horizontal edge filtering, according to an example embodiment of the present invention.
Figure 3B:
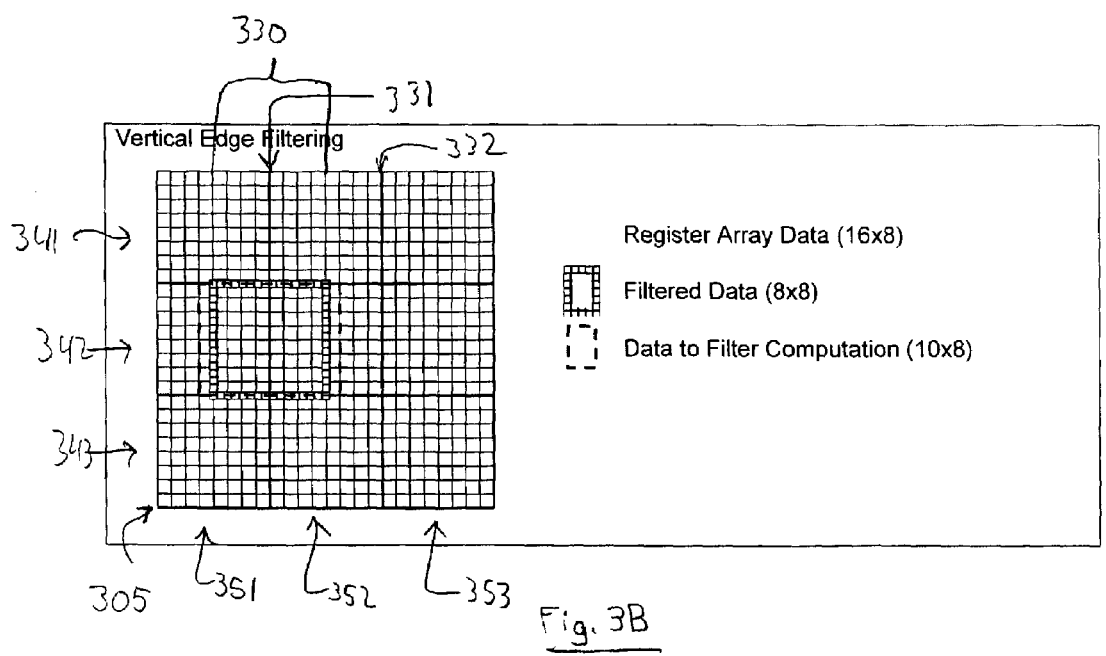
FIG. 3B shows vertical edge filtering of data using a register array configured and arranged for vertical edge filtering, according to an example embodiment of the present invention.

FIGS. 3A and 3B show pixels in an array 305 undergoing filtering using a register array, such as register array 200 shown in FIG. 2A, according to another example embodiment of the present invention. Referring to FIG. 3A and using register array 200 in FIG. 2A as an example, pixel data along a horizontal edge 321 shared by 8×8 pixel blocks at 8×-rows 341 and 342 of 8×-column 352 is filtered (where an 8× row or column refers to a row or column of 8×8 pixel blocks). First, data in the 8×8 pixel block at 8×-row 341, 8×-column 352 is read from memory and loaded into the upper pixel block portion 220 (of FIG. 2A), and data in the 8×8 pixel block at 8×-row 342, 8×-column 352 is read from memory and loaded into the lower pixel block portion 225 (of FIG. 2A). Slices (a 1×10 column) of portion 320 of the pixel blocks on opposite sides of edge 321 are sent to a filtering circuit that uses filtering circuitry and a filtering algorithm as discussed above. The slices may be taken, for example, from column 0 using a shift register to shift each of columns 1–7 one column to the right, as discussed above in connection with block diagram 240 in FIG. 2B. After filtering, the upper pixel block portion 220 is unloaded from the register array and written back into memory. The lower pixel block portion 225 is shifted into the upper pixel block portion 220 and the 8×8 pixel block at 8×-row 343, 8×-column 352 is read from memory and loaded into the lower pixel block portion 225. Edge data on opposite sides of edge 322 in 8×-column 352 is then similarly filtered. After data near edges 321 and 322 in 8×-column 352 has been filtered, new data from 8×-rows 341 and 342 of one of the adjacent 8×-columns 351 or 353 is read into both upper and lower portions of the register array 200 for carrying out similar filtering operations.

Referring now to FIG. 3B, vertical edge data is filtered in a similar manner to the filtering carried out in FIG. 3A, but using a horizontally-oriented 16×8 register array (e.g., by turning register array 200 of FIG. 2A on its side), according to another example embodiment of the present invention. Data in 8×-row 342 is filtered from left to right, beginning with 8×-column 351 and 352 and continuing to 8×-column 353. Data at the 8×8 pixel blocks in 8×-row 342, 8×-columns 351 and 352 is read into the left and right halves of the 16×8 array. Edge pixel data slices (a 10×1 row) in portion 330 of 8×-columns 351 and 352 on opposite sides of edge 331 in 8×-row 342 are used in a filtering algorithm to filter pixel data in each of four pixels on opposite sides of the edge 331 in 8×-row 342. After filtering, filtered data from the middle portion of the register array (e.g., an 8×8 block in 8×-row 342 extending four pixels to either side of the edge 331) is unloaded and written back into memory. Data in the right half of the register array is shifted to the left half of the register array and data in the 8×8 pixel block at 8×-row 342, 8×-column 353 is read from memory and loaded into the right half of the register array. Pixel data on opposite sides of edge 332 in 8×-row 342 is then filtered using 10×1 slices in a similar manner, with the process continuing again at 8×-rows 341 and/or 343, if desired.

Referring now to FIGS. 4A–4D, an array 400 of pixels, with an upper left corner of an image being represented by the pixels shown, is filtered using a 16×16 register array (not shown) for filtering both horizontal and vertical edge data, according to another example embodiment of the present invention. The 16×16 register array is similar to the 8×16 register array discussed in connection with FIGS. 2A and 2B above. The array 400 includes 16×16 blocks of pixel data in 16×-rows 441 and 442 and 16×-columns 451 and 452, with each 16×16 block having vertical and horizontal edge portions between individual 8×8 pixel blocks (where a 16× row or column refers to a row or column of 16×16 pixel blocks). Vertical edges 431, 432 and 433; and horizontal edges 421, 422 and 423 separate individual 8×8 pixel blocks. The array 400 is filtered using a first pass through the array for horizontal edge filtering and a first half of the vertical edge filtering, and using a second pass through the array for the remaining half of the vertical edge filtering. By writing only half of the data to memory during the second pass, memory write cycles are reduced, relative to the 8×16 register array size.

Figure 4B:
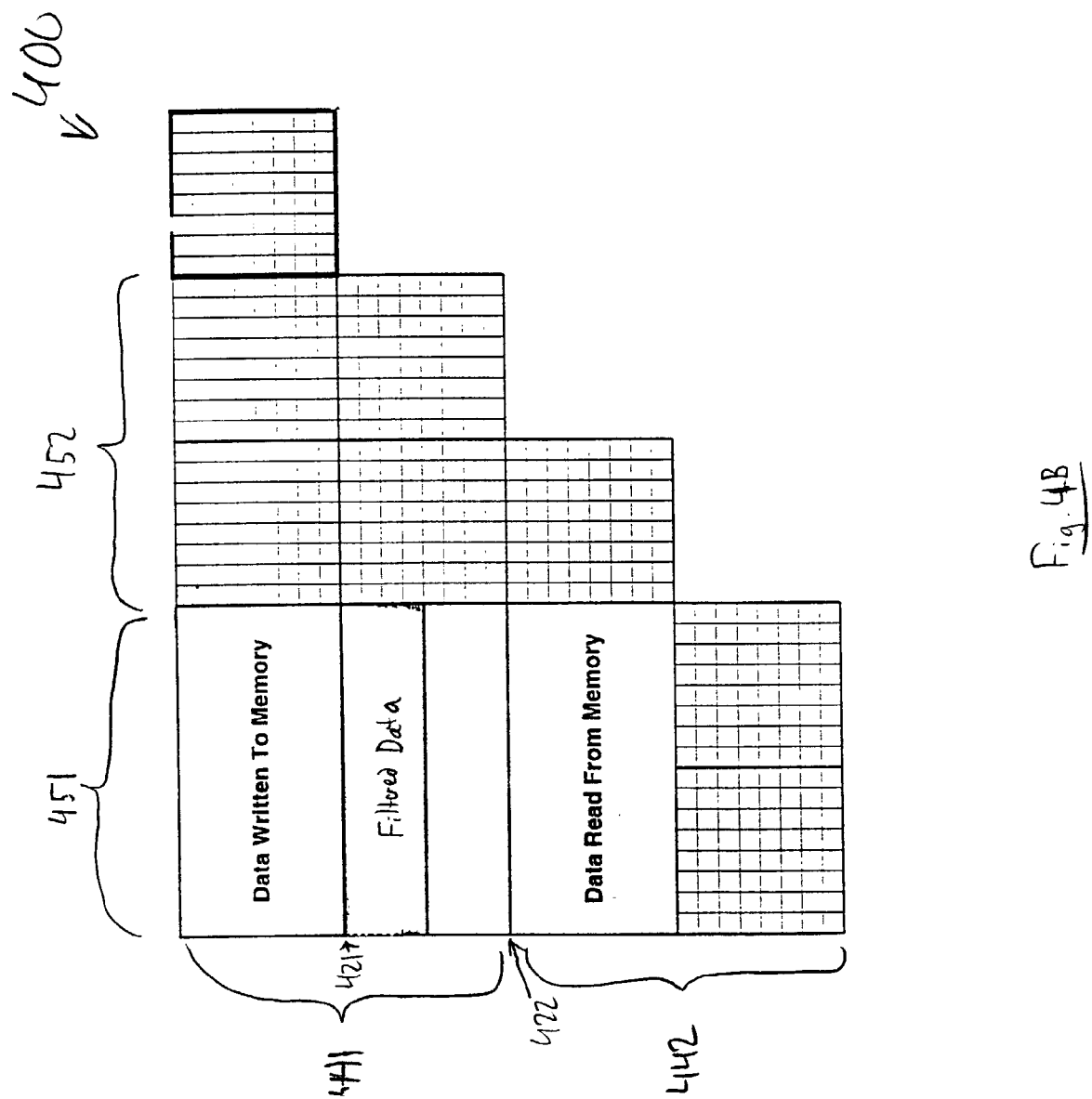

In FIG. 4B, pixel data along horizontal edge 421 and along vertical edge 431 in the 16×16 block at 16×-row 441, 16×-column 451 is filtered. Filtering begins at the top left corner of the image, with the 16×16 block of pixels being loaded into the 16×16 register array. For each row of data, 4 words (quads) are read. In the 16×16 register array, filtering is first performed on the entire horizontal edge 421 for the 16 pixel columns, with pixels in the four rows nearest the horizontal edge 421 being filtered, for example, in manner similar to those discussed above.

The vertical edge 431 for the upper 8 pixel rows in the 16×16 register array is then filtered for example, by filtering four columns on opposing sides of the edge 431 for each of the upper 8 rows. In one implementation, horizontal slices of data are taken from the topmost row and sent to filtering circuitry, with filtered data being returned from the filtering circuitry into the row immediately adjacent to the horizontal edge 421 and with each of the other 8 pixel rows being shifted one row upward. In addition, data in the horizontal slices used for filtering but not being returned is wrapped from the topmost row into the row immediately adjacent to the horizontal edge 421. After the vertical edge 431 is filtered, the top half (8 pixel rows immediately above edge 421) of the 16×16 register array is unloaded from the array and written to memory.

After the upper 8 rows of the 16×16 array are unloaded from the array, the lower 8 rows of the 16×16 register array, including the filtered data in the four rows immediately adjacent to the edge 421, are then shifted into the upper 8 rows of the 16×16 register array. Next, the 8 pixel rows immediately below edge 422 in FIG. 4B are read from memory and loaded into the lower 8 rows of the 16×16 register array, such that the 16×16 register array includes data for the lower half of 16×-row 441 and the upper half of 16×-row 442.

Figure 4C:
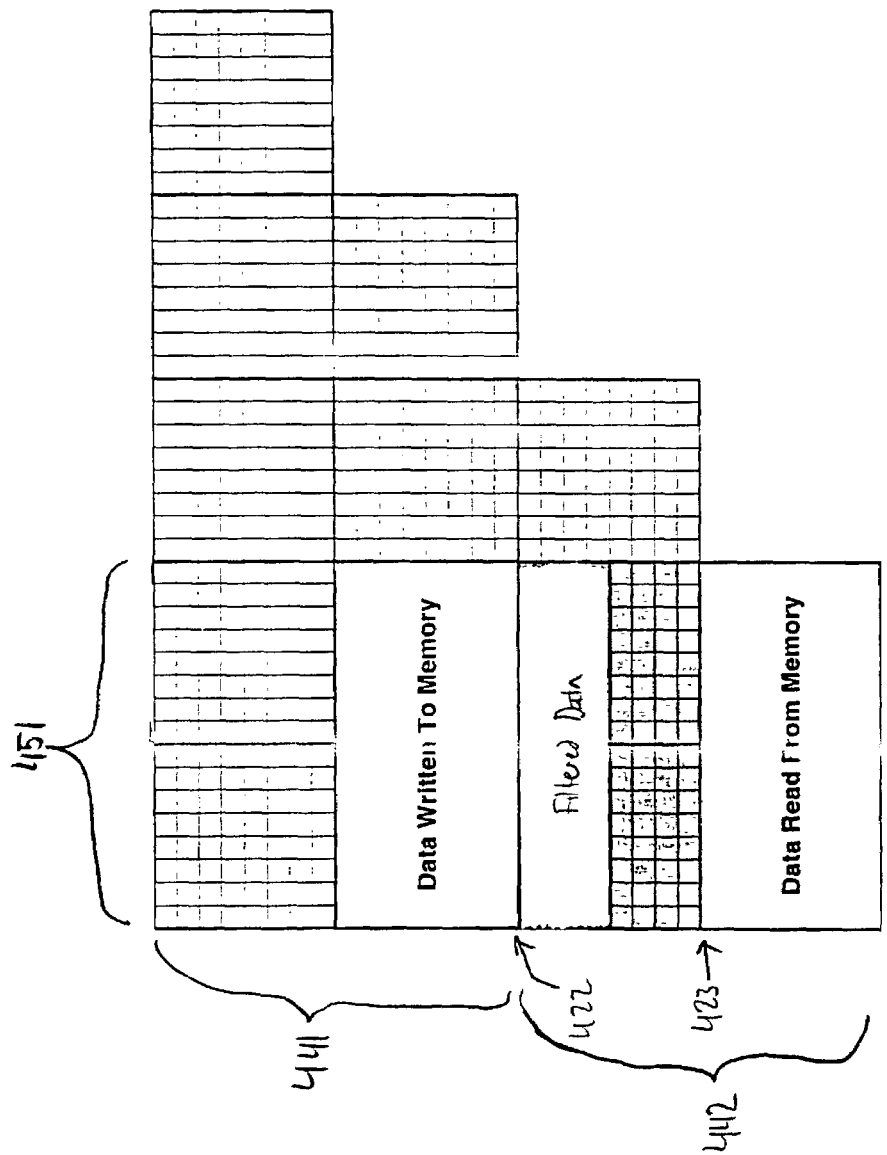

FIG. 4C shows the filtering operation subsequent to that shown in FIG. 4B, above-discussed sequence of filtering, unloading and loading is repeated for a consecutive 8 rows of pixel data. When a bottom of a column (not shown) in the array 400 is reached, the vertical edge filtering is performed on the entire vertical edge stored in the 16×16 register array, and all 16 rows of the 16×16 register array are unloaded and written into memory. The filtering then moves to the next 16×-column 452 in the array 400, as shown in FIG. 4D, beginning with loading the 16×16 register array with the data in the 16×16 pixel block at 16×-row 441, 16×-column 452. The filtering is similarly carried out until the entire 16×-column 452 is filtered.

After the first pass through each of the columns in the array 400 is made as discussed above in connection with FIGS. 4A–4D, a second pass through the array 400 is made for filtering the vertical edge data between the 16×16 blocks (e.g., data for vertical edge 432). In one implementation, 16×16 blocks of data are again loaded into a 16×16 register array and the vertical edge data is filtered. For example, by offsetting the 16×16 blocks to the right by one 8×8 block, the vertical edge is centered in the 16×16 array. After filtering, only a center 8×16 slice of the 16×16 array needs to be written back to memory.

In another implementation, 32×8 pixel blocks are read into a 32×8 register array, such as discussed in further detail below. With this approach, bursting capability of a bus used for communicating the pixel data can be used such that, instead of reading 4 words to fill one row of a 16×16 array, 8 words can be read to fill one row of the 32×8 array, making this approach relatively more efficient than the 16×16 array approach.

In another example embodiment of the present invention, a pixel array having a number of pixels that does not divide evenly into a register array size being used is filtered in a manner similar to one or more of the example embodiments herein. For instance, when an array of 88 pixels in width is filtered using a 16×16 register array, there are 5 columns that are 16-pixels wide and one column that is only 8 pixels wide. In this example, the filtering is altered to accommodate the unequal column width (e.g., by detecting the width and performing both horizontal and vertical edge filtering similar to the first pass through each of the columns described above and in FIGS. 4B–4C. The difference is that the horizontal edge filtering is only performed on one half of the 16×16 array, corresponding to the last 8×-column of the memory array).

Figure 5A:
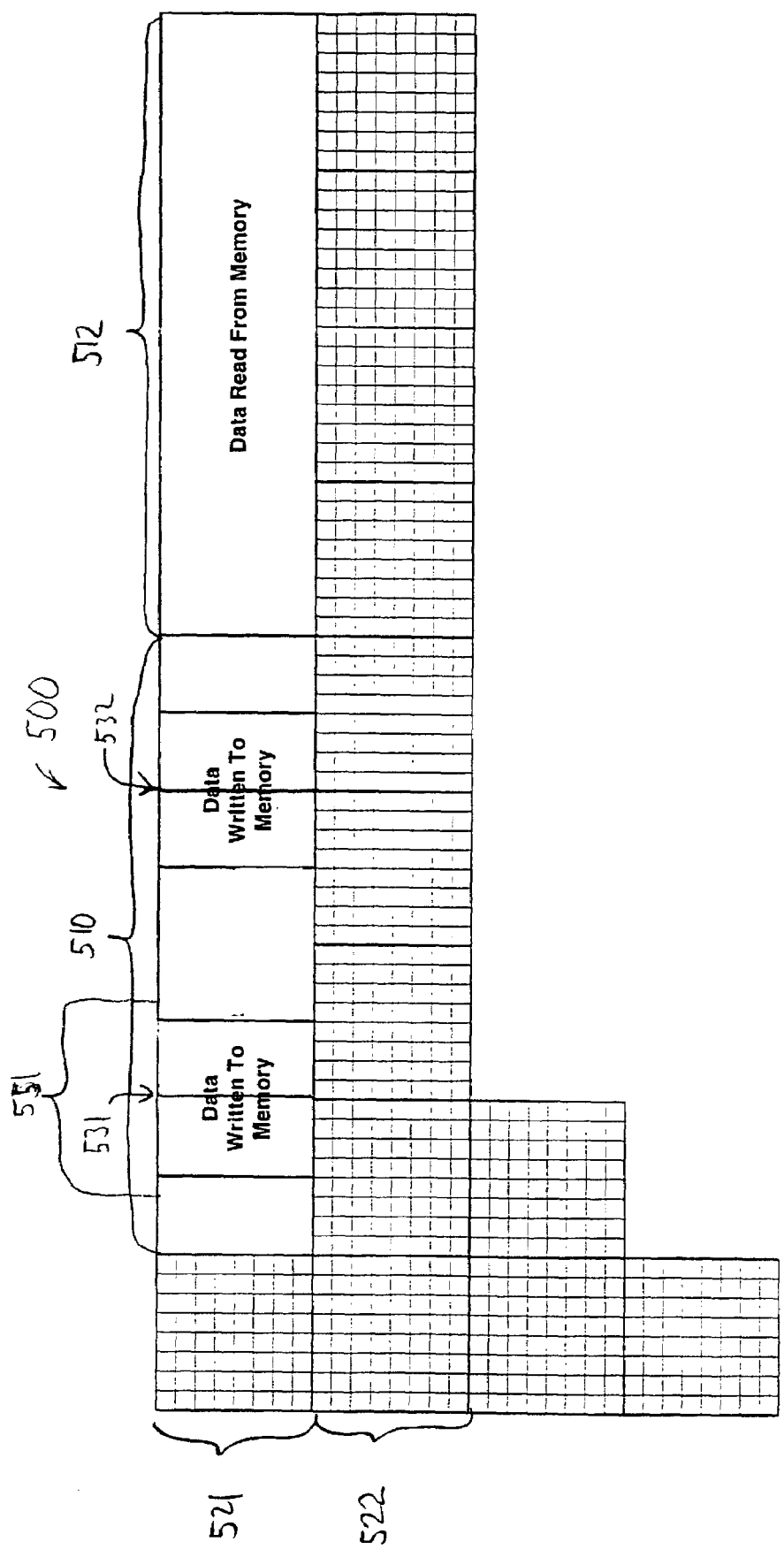

Referring now to FIGS. 5A–5C, vertical edge portions of a pixel array 500 are filtered using 32×8 pixel blocks and a 32×8 register array, according to another example embodiment of the present invention. The pixel array 500 may, for example, be the same as array 400 shown in FIGS. 4A–4D, with the horizontal and vertical filtering steps discussed above having already been performed and with the vertical edges between the 16×16 blocks in the array 400 being unfiltered. With this approach, 16×16 filtering can be accomplished as discussed above, and the remainder of unfiltered vertical edges can be filtered in a relatively more efficient manner than using another 16×16 filtering approach, due to a limited number of remaining edge portions to be filtered.

For instance, the 32×8 register array is particularly useful for simultaneously filtering two separate edge portions in the array using separate filtering logic. With duplicated filtering logic, both edges can be filtered in the same amount of time normally required to filter one edge.

Referring to FIG. 5A, vertical edge pixel data corresponding to two alternate edges of 8×8 pixel blocks (edge 531 and 532) are filtered using, for instance, a two-dimensional shift register as discussed above. A 32-pixel wide portion 510 of 8x-row 521 is read into a 32×8 register array (not shown), similar to the 8×16 register array 200 shown in FIG. 2A. Since only edge data from alternate edges needs to be filtered (due the half of the vertical edges having been filtered during the 16×16 filtering discussed above), data does not necessarily have to be written from one half of the 32×8 register array, as done above in connection with the 8×16 and 16×16 register arrays. In this regard, 1×10 slices of data including 5 pixels on either side of the vertical edges being filtered are filtered. Referring to edge 531, 1×10 slices 551 are taken and run through a filtering operation using a two-dimensional shift register, as discussed above. Similarly, slices including 5 pixels on opposite sides of vertical edge 532 are also sent to a filtering computation, after data for the edge 531 is filtered. When the filtering is complete, 8×8 pixel blocks horizontally centered on each of vertical edges 531 and 532 that have been filtered are unloaded from the 32×8 register array and written into memory.

In FIG. 5B, an adjacent 32×8 pixel block 512 in 8x-row 521 is read into the 32×8 register array, and filtering is carried out as discussed above in connection with pixel block 510. 8×8 pixel blocks horizontally centered on vertical edges 533 and 534 are similarly filtered, unloaded and written back into memory. Once the end of a row is reached, the 32×8 filtering resumes on the next 8x-row 522 in a portion 511 immediately below portion 510, as shown in FIG. 5C. The portion 511, with edges 531 and 532, is filtered in a manner similar to the filtering of portion 510, discussed above. Additional rows are similarly filtered until the entire array 500 is filtered.

Figure 6:
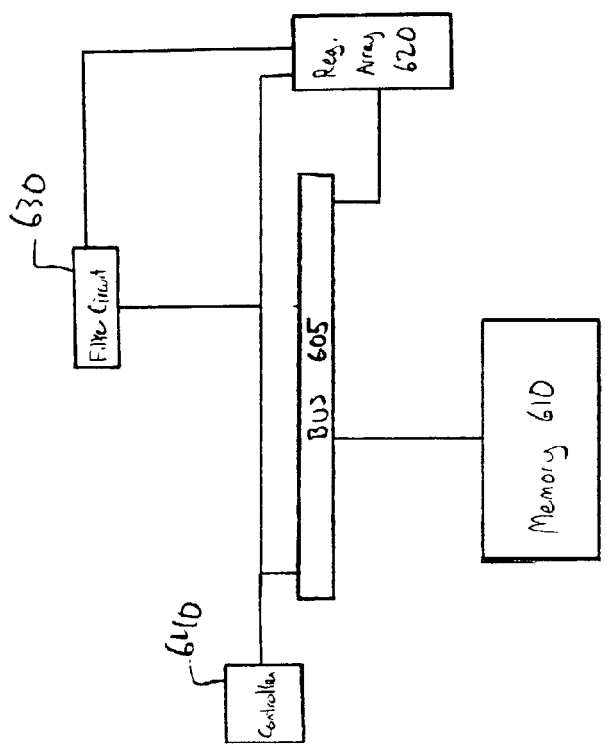
FIG. 6 is a system for filtering pixel data, according to another example embodiment of the present invention.

FIG. 6 shows a system 600 configured and arranged for filtering blocks of pixel data, according to another example embodiment of the present invention. The system 600 includes a memory 610 arranged to store image data for pixels to be displayed, such as on a television or a computer screen. The memory 610 is communicatively coupled to a bus 605 that is arranged for transferring pixel data, such as a 32-bit bus arranged for communicating words representing pixel data, as discussed above. The bus 605 communicatively couples the memory 610 with a controller 640 and a register array 620. The controller 640 is adapted to direct the movement of data between the memory 610 and the register array 620, as well as between the register array 620 and a filter circuit 630. The register array 620 and filter circuit 630 are arranged to filter pixel edge data in a manner that shifts and re-uses data in the register 620 for filtering subsequent edges. In one implementation, the register array 620 is configured, arranged and operated via controller 640 in a manner that is consistent with that discussed in connection with FIGS. 2A and 2B above.

For more information regarding filtering sequences and approaches consistent with one or more example embodiments of the present invention, and for further implementations of one or more example embodiments, reference may be made to the attached Appendix (parts A and B), which is fully incorporated herein by reference.

The present invention should not be considered limited to the particular examples described above. For example, the order of filtering may be switched (e.g., top-to-bottom, bottom-to-top or right-to-left, left-to right), the size of the register arrays may be altered and/or other similar variations may be implemented. Various modifications, equivalent processes, as well as numerous structures to which the present invention may be applicable fall within the scope of the present invention, as fairly set forth in the appended claims.

What is claimed is:

1. A signal filtering arrangement configured and arranged to filter both horizontal and vertical video image data using a single data storage arrangement, the signal filtering arrangement comprising a controller and a register array, the controller and register array being configured and arranged for:
   loading the register array with at least two contiguous sets of video pixel data from memory during a load/unload cycle, the two contiguous sets of video pixel data having an edge therebetween;
   having a portion of the loaded video pixel data that corresoonds to edge data from each of the two sets of video pixel data filtered and returned to the register array; and
   after the portion of the loaded video data is filtered, having a first set of the video pixel data unloaded to the memory during a load/unload cycle and shifting a second set of the video pixel data in the storage arrangement for filtering subsequent video edge data;
   wherein the controller is further configured and arranged for controlling the shifting of the second set of the video pixel data during one of the load/unload cycles; and
   wherein the register array is a two-dimensional shift register configured and arranged for being loaded from different sides for loading the video pixel data for both horizontal and vertical edge filtering and to shift the second set of the video pixel data from one portion of the register to another during a load/unload cycle.

2. The signal filtering arrangement of claim 1, wherein the two-dimesional shift register is further configured and arranged, at the direction of the controller, for having horizontal rows of data in the two dimensional shift register filtered for vertical edge filtering and for having vertical columns of data in the two dimensional shift register filtered for horizontal edge filtering.

3. A video signal filtering arrangement comprising:
   a memory configured and arranged for storing pixel data for an image;
   filtering circuitry configured and arranged for filtering edge data corresponding to an edge between consecutive blocks of the pixel data;
   a two-dimensional register array comprising rows and columns of registers and being configured and arranged for loading and unloading pixel data using two-dimesional shifts in the register array, each of first and second halves of the register array being configured and arranged for storing consecutive blocks of pixel data for an image, the consecutive blocks of pixel data having an edge therebetween;
   a circuit controller configured and arranged to control data representing the consecutive blocks of pixel data to be read from the memory and loaded into the register array and to control data in the register to be filtered via the filtering circuitry, shifted within the register, unloaded from the register and written back to the memory; and
   wherein, during a single clock cycle, the circuit controller is configured and arranged to control data stored in the second half of the register array to be shifted to the first half of the register array and to control data read from the memory to be loaded into the second half of the register array.

4. The video signal filtering arrangement of claim 3, wherein the circuit controller is further configured and arranged to control pixel data on opposite sides of the edge to be filtered by controlling a selected number of consecutive registers in a column intersecting the edge to be filtered via the filtering circuitry and loaded back into the register array.

5. The video signal filtering arrangement of claim 4, wherein the circuit controller is configured and arranged to control pixel data from a column of 10 registers in the register array to be sent to the filtering circuitry, the column of 10 registers being centered on the edge, and to control pixel data corresponding to 8 registers in the column of 10 registers to be returned from the filtering circuitry to the register array, the 8 registers being centered on the edge.

6. The video signal filtering arrangement of claim 5, wherein the two-dimesional register array comprises 8 columns and 16 rows and wherein the circuit controller is further configured and arranged to control data in 10 registers in each of the 8 columns to be shifted to the right for filtering the pixel data in the register array, with data in the rightmost column of registers being filtered and wrapped back to the leftmost column and data in each of the other columns being shifted one column to the right.

7. The video signal filtering arrangement of claim 4, wherein the circuit controller is configured and arranged to detect a pixel array size corresponding to an image to be filtered, and, in response to the pixel array size not dividing evenly into the register array size, altering a filtering operation of a last set of filter data in a series for filtering in the register array when the last set of filter data does not completely fill the register array.

8. The video signal filtering arrangement of claim 3, wherein the circuit controller is further configured and arranged for controlling data to be loaded and unloaded from the register array for filtering both horizontal and vertical edges of an image represented by the pixel data.

9. The video signal filtering arrangement of claim 8, wherein the circuit controller is configured and arranged for unloading and writing data having undergone horizontal and vertical edge filtering to memory.

10. The video signal filtering arrangement of claim 9, wherein the two-dimensional register array is a 16×16 register array having 16 horizontal rows and 16 vertical columns of registers and wherein the circuit controller is configured and arranged to control the filtering circuitry and the register array to filter horizontal edge data along a horizontal edge between 8 upper and 8 lower rows of registers and to filter vertical edge data along a vertical edge between 8 left-side and 8 right-side columns in the upper 8 rows of the 16×16 register array, and to unload the upper 8 rows of the register array, including the filtered horizontal and vertical edge data, and write the unloaded 8 rows into the memory.

11. The video signal filtering arrangement of claim 10, further comprising a 32×8 register array having 8 horizontal rows and 32 vertical columns of registers and wherein the circuit controller is configured and arranged to control the filtering circuitry and the 32×8 register array to filter vertical edge data along a vertical edge between 16×16 blocks of pixel data previously filtered using the 16×16 register array.

12. The video signal filtering arrangement of claim 3, wherein the circuit controller is configured and arranged to control the data being loaded into the array to be byte order reversed for vertical edge filtering.

13. A method for filtering video pixel data, the method comprising:
reading first and second consecutive blocks of pixel data from a memory, each of the first and second consecutive blocks of pixel data corresponding to an image and sharing an edge of a portion of the image disposed therebetween, and loading the consecutive blocks of pixel data into first and second halves, respectively, of a register array having vertical columns and horizontal rows of registers;
filtering at least the data in each of the first and second halves of the register array that corresponds to pixels immediately adjacent to the edge;
after filtering, unloading data from the first half of the register array and writing the unloaded data into the memory;
shifting the data from the second half of the register array into the first half of the register array; and
reading an additional block of pixel data corresponding to the image from the memory, the additional block being consecutive to and sharing an edge with the pixel block shifted to the first half of the register array, loading the additional block into the second half of the register array and repeating the filtering and unloading steps above.

14. The method of claim 13, further comprising repeating the steps of shifting the data, reading an additional block of pixel data, filtering, and unloading and writing the filtered data for a plurality of consecutive pixel blocks of the image.

15. The method of claim 13, wherein filtering includes filtering data corresponding to pixels immediately adjacent to a horizontal edge of a portion of the image shared by consecutive blocks of pixel data and filtering data corresponding to pixels immediately adjacent to a vertical edge of a portion of the image shred by consecutive blocks of pixel data.

16. The method of claim 13, wherein filtering includes filtering data corresponding to pixels immediately adjacent to a vertical edge of a portion of the image shared by consecutive blocks of pixel data, further comprising reversing the byte order of the data to orient the data for vertical filtering in the register array.

17. The method of claim 13, wherein filtering comprises:
sending data from a column of registers in the register array to filtering circuitry, the column of registers corresponding to pixels on opposite sides of an edge between consecutive pixel blocks; and
returning filtered data for the column of registers from the filtering circuitry to the register array.

18. The method of claim 17, further comprising:
repeating the steps of sending data from a column of registers and returning filtered data for each column in the register array, with data in each column being shifted one column to the right, a rightmost column being filtered and wrapped back to a leftmost column after each column is filtered.

19. The method of claim 18, wherein returning filtered data for the column of registers includes returning only a portion of the data sent to the filtering circuitry, further comprising shifting, from the rightmost column to the leftmost column, unfiltered data in the registers sent to the filtering circuitry but not returned.

20. The method of claim 13, wherein the first and second consecutive blocks of pixel data correspond to vertically-adjacent portions of the image and share a horizontal edge, wherein filtering includes filtering data on opposite sides of the horizontal edge and wherein shifting the data includes shifting data from a lower half of the register array to an upper half of the register array.

21. The method of claim 13, wherein the first and second consecutive blocks of pixel data correspond to horizontally-adjacent portions of the image and share a vertical edge, wherein filtering includes filtering data on opposite sides of the vertical edge and wherein shifting the data includes shifting data from a lower half of the register array to an upper half of the register array, further comprising reversing the byte order of the pixel data for the first and second consecutive blocks of pixel data prior to loading the consecutive blocks into the register array and reversing the byte order of the additional block of pixel data prior to loading the additional block into the second half of the register array, wherein unloading data from the first half of the register array includes unloading the filtered data and reversing the byte order of the filtered data to orient the data with the image in memory.

22. A method for filtering video pixel data, the method comprising:
  reading first and second consecutive blocks of pixel data from a memory, each of the first and second consecutive blocks of pixel data corresponding to an image and sharing an edge of a portion of the image disposed therebetween, and loading the consecutive blocks of pixel data into first and second halves, respectively, of a register array having vertical columns and horizontal rows of registers, the edge corresponding to an edge between the first and second halves of the register array;
  reading pixel data from selected rows on opposite sides of the edge from a rightmost column of the register array and filtering at least a portion of the read pixel data;
  shifting the data in the register corresponding to the selected rows one column to the right, with the data filtered from the rightmost column being shifted to the leftmost column and unfiltered read pixel data from the selected rows in the rightmost column being shifted to the leftmost column;
  repeating the steps of reading pixel data and shifting the data in the register until data in all columns in the register has been filtered and the filtered data is shifted back into its original column;
  after filtering, unloading data from the first half of the register array and writing the unloaded data into the memory;
  shifting the data from the second half of the register array into the first half of the register array; and
  reading an additional block of pixel data from the memory, the additional block being a pixel block that is consecutive to and that shares an edge with the pixel block shifted to the first half of the register array, loading the additional block into the second half of the register array and repeating the filtering and unloading steps above.

23. A system for filtering video pixel data, the system comprising:
  means for reading first and second consecutive blocks of pixel data from a memory, each of the first and second consecutive blocks of pixel data corresponding to an image and sharing an edge of a portion of the image disposed therebetween, and loading the consecutive blocks of pixel data into first and second halves, respectively, of a register array having vertical columns and horizontal rows of registers;
  means for filtering at least the data in each of the first and second halves of the register array that corresponds to pixels immediately adjacent to the edge;
  means for unloading the data from the first half of the register array and writing the unloaded data into the memory after filtering;
  means for shifting the data from the second half of the register array into the first half of the register array; and
  means for reading an additional block of pixel data corresponding to the image from the memory, the additional block being consecutive to and sharing an edge with the pixel block shifted to the first half of the register array, loading the additional block into the second half of the register array and repeating the filtering and unloading steps above.

24. A system for filtering video pixel data, the system comprising:
  a memory;
  a register array having vertical columns and horizontal rows of registers;
  a controller configured and arranged for controlling first and second consecutive blocks of pixel data to be read from the memory and loaded into first and second halves, respectively, of the register array, each of the first and second consecutive blocks of pixel data corresponding to an image and sharing an edge of a portion of the image disposed therebetween;
  filtering circuitry configured and arranged for filtering at least the data in each of the first and second halves of the register array that corresponds to pixels immediately adjacent to the edge; and
  wherein the controller is further configured and arranged for, after the filtering, controlling the data from the first half of the register array to be unloaded and written into the memory, controlling the data from the second half of the register array to be shifted into the first half of the register array and controlling an additional block of pixel data corresponding to the image from the memory to be read and loaded into the second half of the register may, the additional block being consecutive to and sharing an edge with the pixel block shifted to the first half of the register array, and controlling the filtering and unloading steps above to be repeated.

25. The system of claim 24, wherein, during a single clock cycle, the controller is configured and arranged to control data stored in the second half of the register array to be shifted to the first half of the register array and to control data read from the memory to be loaded into the second half of the register.

26. The system of claim 25, wherein the filtering circuitry includes two independent blocks of filter computation logic circuitry, wherein the register array has at least two sets of tap points, one for each block of computation logic circuitry, wherein a first set of tap points is for tapping a first set of columns in the register array and wherein a second set of tap points is for tapping a second set of columns in the register array.

* * * * *